United States Patent
Boiero et al.

(10) Patent No.: US 7,940,216 B2
(45) Date of Patent: May 10, 2011

(54) METHOD AND SYSTEM FOR MOBILE NETWORK AIDED POSITIONING

(75) Inventors: Gianluca Boiero, Turin (IT); Giorgio Ghinamo, Turin (IT); Pasquale Digregorio, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 11/992,063

(22) PCT Filed: Sep. 15, 2005

(86) PCT No.: PCT/EP2005/009934
§ 371 (c)(1),
(2), (4) Date: Apr. 2, 2009

(87) PCT Pub. No.: WO2007/031103
PCT Pub. Date: Mar. 22, 2007

(65) Prior Publication Data
US 2009/0303117 A1    Dec. 10, 2009

(51) Int. Cl.
*G01S 3/02*    (2006.01)
*G01S 19/25*    (2010.01)

(52) U.S. Cl. .................... 342/450; 342/357.64

(58) Field of Classification Search ............. 342/357.25, 342/357.64, 450, 457, 465; 701/207, 213
See application file for complete search history.

(56) References Cited

U.S. PATENT DOCUMENTS

| 5,379,224 | A | 1/1995 | Brown et al. |
| 6,542,821 | B2 | 4/2003 | Krasner |
| 2002/0044087 | A1 | 4/2002 | Krasner |
| 2003/0063028 | A1 | 4/2003 | Caswell et al. |
| 2003/0151547 | A1 | 8/2003 | Mauro et al. |

FOREIGN PATENT DOCUMENTS

| WO | WO-02/12914 A2 | 2/2002 |
| WO | WO-2004/001993 A1 | 12/2003 |

*Primary Examiner* — Dao L Phan
(74) *Attorney, Agent, or Firm* — Finnegan, Henderson, Farabow, Garrett & Dunner, L.L.P.

(57) ABSTRACT

A method for fixing a position of a user apparatus includes the step of starting a fixing session and, within the fixing session, determining a size of a snapshot of a signal of a positioning system depending on the receiving conditions of the signal at the user apparatus, the snapshot being capable of enabling the fixing of the position; receiving, at network equipment, from the user apparatus via a network connection the snapshot; and fixing at the network equipment the position of the user apparatus on the basis of the snapshot.

15 Claims, 3 Drawing Sheets

METHOD AND SYSTEM FOR MOBILE NETWORK AIDED POSITIONING

CROSS REFERENCE TO RELATED APPLICATION

This application is a national phase application based on PCT/EP2005/009934, filed Sep. 15, 2005, the content of which is incorporated herein by reference.

FIELD OF THE INVENTION

The present invention generally relates to the field of network aided positioning, in particular to a geographical positioning service provided by a mobile network, such as a GSM, GPRS, EDGE, UMTS network or the like, based on a positioning signal such as the satellite positioning signal of the Global Positioning System (GPS) or the Galileo.

BACKGROUND OF THE INVENTION

In recent years, positioning systems have been put into practical use, such as the GPS, or are planned to be deployed, such as the prospective satellite-based Galileo, and are expected to gain more and more popularity.

The GPS is a well known multiple-satellite based radio positioning system in which each GPS satellite transmits data that allows a GPS receiver to precisely measure the distance from selected ones of the GPS satellites to its antenna and to thereafter compute position, velocity, and/or time parameters to a high degree of accuracy, using known triangulation techniques. The satellites are positioned in a constellation such that typically seven, but a minimum of four, satellites are observable by a receiver anywhere on or near the earth's surface. Each satellite's signals are synchronized to an atomic clock and the normal user apparatus' clock is in error by a clock bias. By measuring the apparent satellite signal propagation times from four satellites rather than three, the redundancy can be used to solve for clock bias and the position calculated. Prior to correction for the user's clock bias, the apparent ranges of the satellites are all in error by a fixed amount and are called pseudoranges.

Each satellite transmits signals on a center frequency of 1575.42 MHz within a band known as L1, using spread spectrum techniques that employ a coarse/acquisition (C/A) pseudo random noise (PRN) code. The codes have a binary phase-reversal rate, or "chipping" rate, of 1.023 MHz and a repetition period of 1023 chips for a code period of 1 msec. The code sequences belong to a family known as Gold codes. Each GPS satellite broadcasts a signal with a unique Gold code. The signals received at a user's receiver have a bandwidth of approximately 2 MHz and a typical signal to noise ratio of about −20 dB.

Superimposed on the C/A code is the navigation message, i.e. a direct sequence spread spectrum, 50 bit/s binary phase shift keyed data signal. It contains, among others, the GPS system time, the satellite clock correction parameters, ephemeris data for the particular satellites being tracked and almanac data for all of the satellites in the constellation. The ephemeris consists of detailed information about the satellite's own course over the next two hours, the almanac consists of less detailed information about the complete satellite constellation for a longer period and the clock correction parameters allow the user apparatus to correct for the errors of the GPS satellite's own clock.

There are two principal functions of GPS receiving systems: (1) computation of the pseudoranges to the various GPS satellites, and (2) computation of the position (and other navigation data) of the receiver using these pseudoranges and satellite timing and ephemeris data. The satellite ephemeris and timing data is extracted from the GPS signal once it is acquired and tracked.

Virtually all known GPS receivers utilize correlation methods to compute code-phases (see below). For a signal received from a given GPS satellite, following a downconversion process to baseband, a correlation receiver multiplies the received signal by a stored replica of the appropriate Gold code contained within its local memory, and then integrates, or lowpass filters, the product in order to obtain an indication of the presence of the signal. This process is termed a "correlation" operation. By sequentially adjusting the relative timing of this stored replica relative to the received signal, and observing the correlation output, the receiver can determine the time delay between the received signal code and the local code replica ('code-phase'). The initial determination of the presence of such an output is termed "acquisition." Once acquisition occurs, the process enters the "tracking" phase in which the timing of the local reference is adjusted in small amounts in order to maintain a high correlation output and to refine the code-phase and carrier frequency measures. The correlation output during the tracking phase may be viewed as the GPS signal with the pseudorandom code removed, or, in common terminology, "despread", which represents the navigation signal.

In addition, since the satellites are each moving at a speed in excess of 3 km/s, the GPS signals are received with a Doppler frequency offset from the GPS centre frequency. As a result, a mobile GPS receiver has to be capable of receiving signals with frequencies having an offset greater than ±4 KHz from the GPS centre frequency. To recover the data and measure the propagation time of the satellite signals, the GPS receiver must cancel or allow for the Doppler frequency offset and generate the C/A code relevant to each satellite.

Typically, in conventional standalone GPS receivers all navigation processing activities (e.g. acquisition, tracking and navigation solution) occur at the receiver, which outputs the position and velocity of the receiver. The process of searching for and acquiring GPS signals, reading the ephemeris data for a multiplicity of satellites and computing the location of the receiver from this data is time consuming, especially if received signals are weak, often requiring several minutes. In many cases, this lengthy processing time is unacceptable and, furthermore, greatly limits battery life in micro-miniaturized portable applications. To improve acquisition time, most GPS receivers utilize a large number of correlators which allows a parallel search for correlation peaks.

Another limitation of conventional GPS receivers is that their operation, in order to achieve low error rates, is limited to situations in which multiple satellites are clearly in view, without obstructions or attenuations, and where a good quality antenna is properly positioned to receive such signals. A standalone conventional GPS receiver requires strong signals (>=−135 dBm) over long time periods to perform its functions without any external assistance. As such, they normally are unusable in portable, body mounted applications; in areas where there is significant foliage or building blockage (e.g., urban canyons); and in indoor applications.

Cellular phones for mobile communication through a mobile network which comprise, or are associated to, GPS receivers are rapidly gaining popularity. The association of the GPS receivers with cellular phones, together with the diffusion of location based services, which may typically need a fix of the position of a user apparatus, are driving the need of having a fix of the position of the user apparatus based on a signal of a positioning system in urban and/or indoor environments, which are typical environments for the use of cellular phones and of mobile network services.

The Applicant has noted that prior art GPS receivers are not suitable for fixing the position of a user apparatus in cellular-related environments, such as in particular in urban or indoor environments.

The urban and indoor environments are typically characterized by difficult receiving conditions. For example, the indoor environment typically shows receiving conditions characterized by strong attenuation of the received positioning signal, which may suffer an additional attenuation of about 10-20 dB with respect to strong field receiving conditions (e.g., open field), wherein typically the minimum signal level is at about −135 dBm. On the other hand, the urban environment (in particular, e.g., 'urban canyon' environment) typically shows the problem of restricted visibility of some of the satellites ('sky obstruction') and/or the interference problem, including the multipath problem wherein the positioning signal is reflected by a plurality of surfaces before reaching the receiver. The interference terms lead to an increase of the attenuation and/or noise of the positioning signal and/or an increase in the positioning error. Environments showing difficult receiving conditions are referred to as 'weak signal' environment; while, in the opposite case, the expression 'strong signal' environment is used.

On the other hand, in cellular-related environments the user expects a high quality of service, which means, among others, a high degree of availability of the positioning service and/or a short time-to-first-fix (TTFF), i.e. the time elapsed before having the first fix starting from the request of the fix by the user. The TTFF is particularly important in case the fix of the position based on a positioning signal is done in connection with location based services. In fact, location based services are designed to provide very good user-experience, which includes a very short time to wait before the service is provided.

The requirement of a short TTFF is more demanding in the case (typical for mobile positioning receiver due to the strict power consumption requirements) of the so called 'cold start', i.e. in case the positioning receiver is switched on only upon a request for a fix. In fact, in this case the tracking of the positioning signal takes longer time than that in the case of 'hot start' since no prior information is available in the receiver.

SnapTrack, Inc. has developed a wireless assisted GPS technology for location determination which is air interface independent. For example, U.S. Pat. No. 6,542,821 describes a GPS receiver having circuitry configured to receive and process the pseudorandom sequences during sky blockage conditions. The circuitry processes the pseudorandom sequences by digitizing and storing a predetermined record length of the received sequences and then performs fast convolution operations on the stored data to determine the pseudoranges by way of a programmable digital signal processor.

In the above patent, it is also described a method for determining the position of a remote GPS receiver by storing GPS satellite information, including Doppler, in the remote unit. During blockage conditions, the remote unit uses this information and sampled GPS signals from in view satellites to subsequently compute pseudoranges to the satellites using fast convolution operations. The computed pseudoranges may then be used to determine the position of the remote unit. The position determination can occur at the remote unit or at a basestation. Where the position determination is performed at a basestation, the remote unit transmits via a data link the pseudoranges to the basestation, which can combine this information with the satellite ephemeris data to complete the position calculation. Where the position determination is performed at the GPS receiver, either the Satellite Data Messages are retransmitted to the GPS receiver from the basestation so that the GPS receiver may combine this information with the pseudorange measurements to compute its position or the GPS receiver itself may gather the satellite ephemeris data, which typically is valid for one to two hours, from the reception of GPS signals in the normal manner that is commonly practiced in the art using a conventional GPS receiver.

In the cited U.S. Pat. No. 6,542,821, in order to achieve high sensitivity, a very long portion of waveform, typically 100 ms to 1 s, is processed.

The Applicant has found that computing the pseudoranges at the GPS receiver has the drawback of having a limited computational capacity for the pseudorange calculation itself, especially in view of the requirement to minimize the power consumption. According to the Applicant, this may in turn limit the fix availability, at a desired fixing accuracy, and the reduction of the TTFF. In addition, the above solution results in a complex hardware and/or software of the GPS receiver, thus increasing its cost and/or reliability.

In the art alternatives to the conventional standalone GPS receiver are known which consist in the GPS translators or transdigitizers, wherein the GPS signal is remoted by translation or variations thereof and the signal is tracked at a ground processing facility where the object position and velocity are derived. These translators or transdigitizers typically include only the antenna assembly and RF assembly portions of a GPS receiver and are typically employed in applications where expendable sensors are required. Known transdigitizers retransmit the digitally sampled GPS signal at 2 Msps using quadraphase modulation. In accordance with this approach, significant bandwidth is always required to transmit the translated signal.

U.S. Pat. No. 5,379,224 describes a tracking system using GPS satellites, comprising a GPS sensor module that supplies the data required to locate a particular object, a one-way telemetry link, and a data processing workstation to process the data and display the object position and velocity. The GPS sensor module comprises an antenna and a sensor. The sensor digitally samples the signals from visible GPS satellites and stores this data in a digital buffer. No processing functions are performed by the sensor, thereby permitting significant reductions in the cost thereof. The raw satellite data stored in the buffer are transmitted back to the data processing workstation. Using this set of raw satellite data, the position and velocity of the sensor can be determined at the time the data was recorded. If a 20 kHz data link is used and the GPS signals are sampled at 2 Mbps, a 1-second set of GPS data can be provided every 100 seconds, or a 0.5-second set of GPS data every 50 seconds, or a 0.1-second set of data every 10 seconds.

The Applicant has found that it is desirable to provide a user with a mobile network positioning service based on a positioning signal, which is highly available in both strong and weak signal receiving conditions, while minimizing the bandwidth requirement of the mobile network service. In fact, one important factor for the choice of a service is the price and, whichever is the mobile network connection between the network equipment and the mobile user apparatus, in general the higher is the traffic, the higher is the charge for the service. In particular, for (e.g. packet) data mobile network connection, whichever is the bandwidth, i.e., the data transfer rate provided by the connection itself, the greater is the amount of data to be transferred, the higher is in general the price.

The Applicant has thus faced the problem of providing a method, a system and a service based on the method, for fixing the position at a network equipment of a mobile user apparatus on the basis of a signal of a positioning system received at the user apparatus, wherein the fixing is provided with good availability, for a given fixing accuracy, also in weak signal receiving conditions and a data transfer traffic, associated to the fixing, through a network connection between the user apparatus and the network equipment is optimized at a suitably low level. Moreover, the fixing should preferably be characterized by a short time-to-first-fix, also in cold start conditions. In addition, the fixing of the position should be desirably low-cost, reliable and fast.

SUMMARY OF THE INVENTION

The Applicant has found a method and a system for fixing the position of a user apparatus on the basis of a signal of a positioning system which can solve one or more of the problems stated above. The solution of the present invention is simple, feasible and low cost.

The Applicant believes that the present invention solves the above problem of providing good availability of fix, for a given fixing accuracy, also in weak signal receiving conditions while keeping the size of the data to be transferred as low as possible thanks to the fact that the fixing of the position of a user apparatus is performed at a network equipment on the basis of a snapshot of a signal of a positioning system, the signal being received by the user apparatus, and sent from the user apparatus to the network equipment via a mobile network connection, and that the size of the digital snapshot of the positioning signal is dynamically (i.e. within the current fixing session) determined so as to be adapted to the receiving conditions (e.g., weak or strong signal receiving conditions) of the positioning signal at the user apparatus. The above actions of determining the size, receiving the snapshot at the network equipment and fixing the position are performed within a fixing session which may be started in several ways. For example, it may be started by sending a request for a fix from the user apparatus to the network equipment, or vice versa, or by storing a sample of the positioning signal at the user apparatus.

The receiving conditions are the conditions of reception at the physical layer, i.e. the quality of the positioning signal received at the antenna of the user apparatus, e.g. power level, noise level, interference level, multipath level, sky obstruction level, etc. Typically, the receiving conditions are not explicitly and directly known. In this case, they may be implicitly and/or indirectly inferred by information belonging to higher level layers. In one embodiment, the receiving conditions may be roughly derived by an explicit identification of the environment surrounding the user apparatus (rural or urban, indoor or outdoor, in-car, pedestrian, etc). In another embodiment, they may be implicitly assessed by trying to make the fix on a portion of sample of positioning signal having a given size and, in case the fix is not achieved with the desired accuracy, increasing the size of the portion until a fix is achieved. It is also possible to combine the above techniques in order to identify, at least approximately, the receiving conditions.

The term 'snapshot' or, equivalently, 'digital snapshot' refers to an array of samples obtained by digitally sampling the raw positioning signal, e.g. according to conventional analog-to-digital conversion techniques. The size of said digital snapshot may be a function of the sampling frequency, the number of bits per single sample and the length of time of the sampled raw signal corresponding to the snapshot (hereinafter referred to as 'the snapshot length').

For the purpose of the present invention, the term 'positioning system' is used to indicate any positioning system, terrestrial (such as pseudolite-based) or satellite-based or a combination thereof, global or regional or local, present or prospective. Examples of (satellite-based) positioning systems are the GPS, the Galileo, the Glonass and the like. Typically, the signal of the positioning system (hereinafter 'positioning signal') comprises a plurality of overlapped signals, broadcasted respectively by a plurality of emitters (e.g. satellites and/or pseudolites), together with noise and/or interference terms.

According to an aspect of the present invention, a method for fixing the position Of a user apparatus is provided. The method comprises starting a fixing session and, within said fixing session: determining a size of a snapshot of a signal of a positioning system depending on the receiving conditions of said signal at the user apparatus, said snapshot being apt to enable the fixing of the position; receiving, at a network equipment, from the user apparatus via a network connection said snapshot; and fixing at the network equipment the position of the user apparatus on the basis of said snapshot.

Preferably, the step of determining the size of the snapshot comprises identifying the environment of the user apparatus and determining the size of the snapshot depending on said identified environment.

Preferably, the step of determining the size of the snapshot is performed at the network equipment. In one embodiment, the method further comprises communicating the size of said snapshot to the user apparatus. In another embodiment, the step of receiving said snapshot comprises receiving a first portion of said snapshot. The size of the first portion may be predetermined. In alternative, the step of determining the size of said snapshot comprises determining, at the network equipment, a size of the first portion and further comprising communicating to the user apparatus said size of the first portion before receiving the first portion of said snapshot.

Advantageously, the method above further comprises, at the network equipment, sending to the user apparatus a request for a second portion of said snapshot and the step of receiving said snapshot further comprises receiving said second portion of said snapshot.

In one embodiment, the size of the second portion is predetermined and, preferably, it is at least two times the size of the first portion. Advantageously, the method further comprises sending to the user apparatus a request for a third portion of said snapshot having the respective size predetermined and wherein the step of receiving said snapshot further comprises receiving said third portion of said snapshot.

In another embodiment, the step of determining the size of said snapshot comprises determining, at the network equipment, a size of the second portion and further comprising communicating to the user apparatus said size of the second portion before receiving the second portion of said snapshot.

Advantageously, the step of determining the size of said snapshot comprises receiving measurement data related to at least a signal of a mobile network and determining said size of said snapshot on the basis of said data.

In a preferred configuration, the step of determining the size of said snapshot comprises determining the length of time of the signal of the positioning system corresponding to said snapshot.

The network connection may advantageously be a mobile network connection.

Preferably, the positioning system is a satellite-based positioning system.

The step of starting the fixing session preferably includes receiving at the network equipment from the user apparatus a request for fixing the position.

Preferably, the method above further includes sending the fixed position from the network equipment to the user apparatus through said network connection.

According to another aspect, the present invention relates to a system for providing a service of positioning of a mobile user apparatus, comprising: a network equipment; a mobile user apparatus apt to establish a mobile network connection with the network equipment, the mobile user apparatus comprising a receiver apt to digitally sample a signal of a positioning system; wherein the network equipment and the mobile user apparatus are apt to cooperate so as to implement the method above.

In a still further aspect, the present invention relates to a service for providing a user of a user apparatus of a fix of the position of the user apparatus, wherein said fix of the position is based on the method above.

BRIEF DESCRIPTION OF THE DRAWINGS

The features and advantages of the present invention will be made clear by the following detailed description of one or more embodiments thereof, provided merely by way of non-limitative example, description that will be conducted making reference to the annexed drawings, wherein.

DETAILED DESCRIPTION OF THE PREFERRED EMBODIMENT(S) OF THE INVENTION

Figure 1:
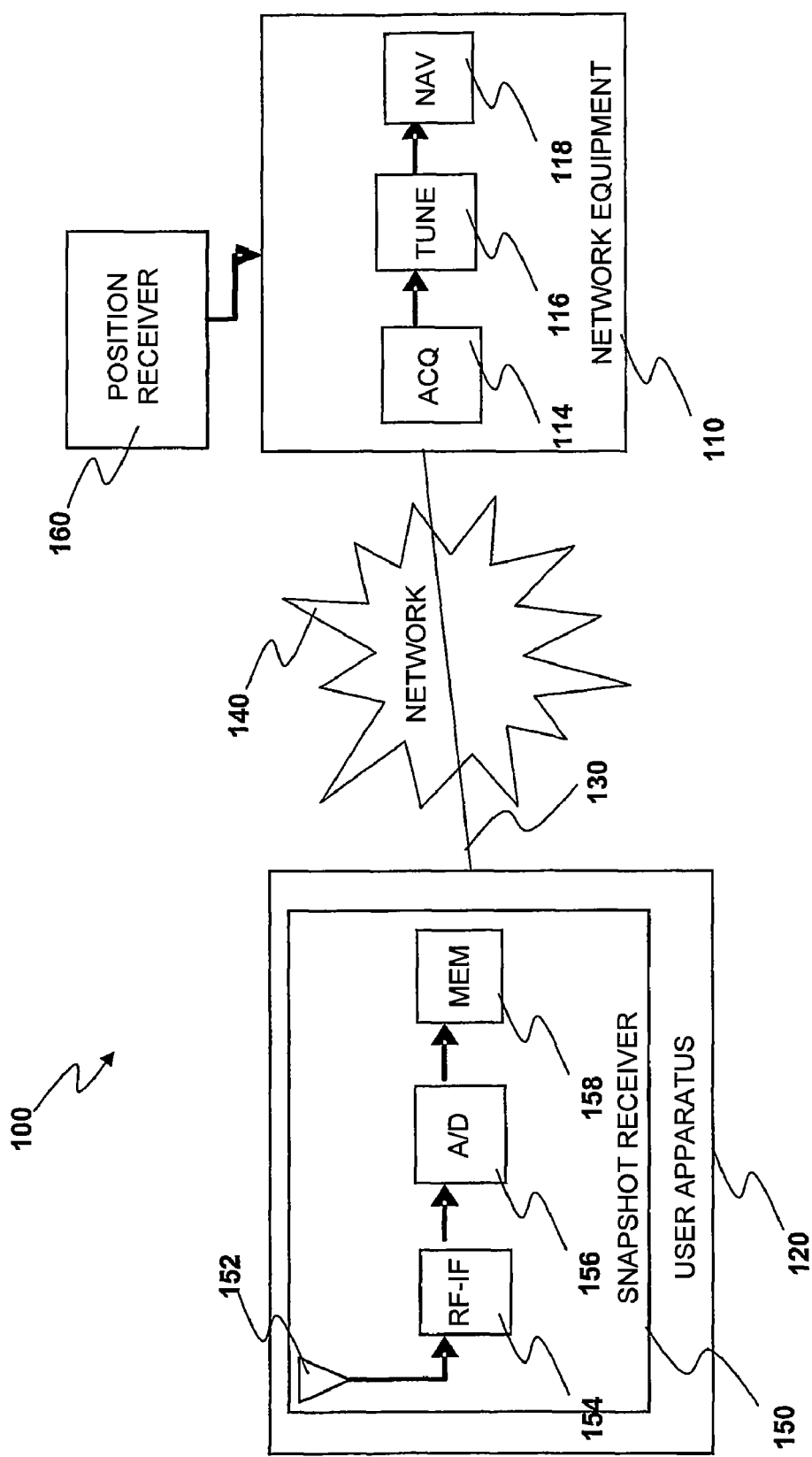
FIG. 1 schematically shows in terms of functional blocks an exemplary system architecture according to the present invention.

FIG. 1 shows a system architecture according to a possible embodiment of the present invention.

The system 100 comprises a network equipment 110 and a user apparatus 120 apt to establish a network connection 130, typically at least in part wireless, with the network equipment, for example through a mobile network 140 such as CDMA, GSM, GPRS/EDGE or UMTS mobile network, well known in the art.

The user apparatus 120 may be a mobile user apparatus such as a cellular phone, a pager, a portable computer, a palmar handset or the like. Typically, it comprises an identifier hardware and/or software, such as a subscriber identity module (SIM), in order to be recognized by, and communicate with, the mobile network 140. It is typically provided with the ability of running dedicated client applications.

According to the present invention, the user apparatus 120 comprises a snapshot receiver 150 which is apt to receive and digitally sample a positioning system signal and to store the digital sample so obtained. The digital sampling may be made according to known techniques. For example the snapshot receiver 150 may comprise an antenna 152 apt to receive the positioning system signal, a RF to IF down-converter 154, an analog to digital converter 156 and a digital memory 158 apt to store the digital sample. The snapshot receiver 150 may, and typically does, comprise additional elements apt to perform, improve and facilitate the function of digitally sampling and storing the received signal, such as electronic filters, amplifiers, limiters, local oscillators, mixers, counters, etc. The structure and operations of the snapshot receiver and of the cited elements comprised therein are known in the art (e.g. the art related to front-end receivers) can be made, e.g., according to FIGS. 2 and 3 of cited U.S. Pat. No. 5,379,224 and the relevant description.

The user apparatus 120 is further apt to send, via conventional radio interface devices (not shown in FIG. 1) comprised therein, all or portions of the stored digital sample to the network equipment 110 through the network connection 130 supported by the mobile network 140.

According to the present invention, the network equipment 110 is apt to receive a digital snapshot of the positioning signal from the user apparatus 120 and to process it in order to calculate a fix of the geographical position of the user apparatus at the time the processed digital snapshot was received by the user apparatus 120. Typically, the fix of the position is given in terms of geographical coordinates such as latitude and longitude. In addition or alternative, also the altitude, the velocity and/or timing data of the user apparatus 120 may be calculated from the received snapshot. The digital snapshot corresponds to all or a portion of the digital sample of the positioning signal stored by the snapshot receiver 150.

The processing of the digital snapshot may be performed according to known techniques. Preferably, the network equipment 110 comprises an acquisition module 114, apt to calculate a first estimate of the code-phases and to evaluate the carrier frequencies of the positioning signal (which are typically affected by different Doppler shifts for the various visible satellites) contained within the received snapshot, a tuning module 116, apt to refine the estimate of the code-phases acquired by the acquisition module (typically without performing a tracking) and a navigation module 118 apt to calculate navigation data (such as geographical position and/or velocity of the user apparatus and/or exact time at the time the processed snapshot was received by the user apparatus) on the basis of the code-phases and carrier frequencies calculated by the tuning module 116. The modules 114, 116 and 118 are purely illustrative of logical blocks and they may correspond to physical entities or to software components running on computer(s).

Advantageously, the network equipment 110 has associated at least one (typically more than one) reference positioning signal receiver 160 which is apt to provide the network equipment with up to date data associated to the positioning system, such as preferably the navigation message. Advantageously, the reference positioning signal receiver 160 may be apt to receive the positioning signal, hereinafter 'reference positioning signal'. In one embodiment the network equipment 110 is provided with functionalities (not shown) to process the raw reference positioning signal received by the reference positioning signal receiver 160 in order to extract reference navigation data, according to techniques well known in the art. In another embodiment, the reference positioning signal receiver 160 is itself apt to continuously track the positioning signal and to decode satellite ephemeris, almanac data, clock corrections, ionospheric corrections and other data, in order to facilitate satellite signal processing from the snapshot received by the user terminal. The satellite data are stored in a memory (not shown) for use by the network equipment 110 in calculating the satellite pseudoranges in respect of the user apparatus 120.

Advantageously, either the reference receiver 160 or the network equipment 110 are apt to calculate code-phases, pseudoranges and position fix from the reference positioning signal in order to allow position fixes of the user apparatus to be made at the network equipment 110 by a differential technique, provided that the reference receiver and the user apparatus are sufficiently close in space (e.g. within a range of 350 km) and time. The network equipment 110 uses the reference receiver 160 to determine its own position and, since this is already known accurately, can calculate an up to date error term for the positioning signal. When the user apparatus 120 position is calculated, this error can be removed from the user apparatus's pseudoranges, which gives an improvement in the accuracy of the positional fix.

The network equipment 110 may or may not form part of the mobile network 140. Advantageously, the network equipment 110 is apt to communicate with the mobile network 140 so as to receive from the latter information on the approximate position and/or on the environment of the user apparatus 120.

The network connection 130 may be any connection, at least in part wireless, apt to allow the exchange of data between the network equipment and the user apparatus. The type of the network connection depends on the type of mobile network 140 which supports such connection. The type of network connection 130 may dynamically change in time, for example it may change from an SMS type connection to a GPRS or EDGE or UMTS connection, depending on the current needs of the interaction between the user apparatus and the network equipment 110. Preferably, the network connection 130 is a data network connection, such as an IP packet data network connection. More preferably, it is a UMTS or WCDMA data network connection.

Figure 2:
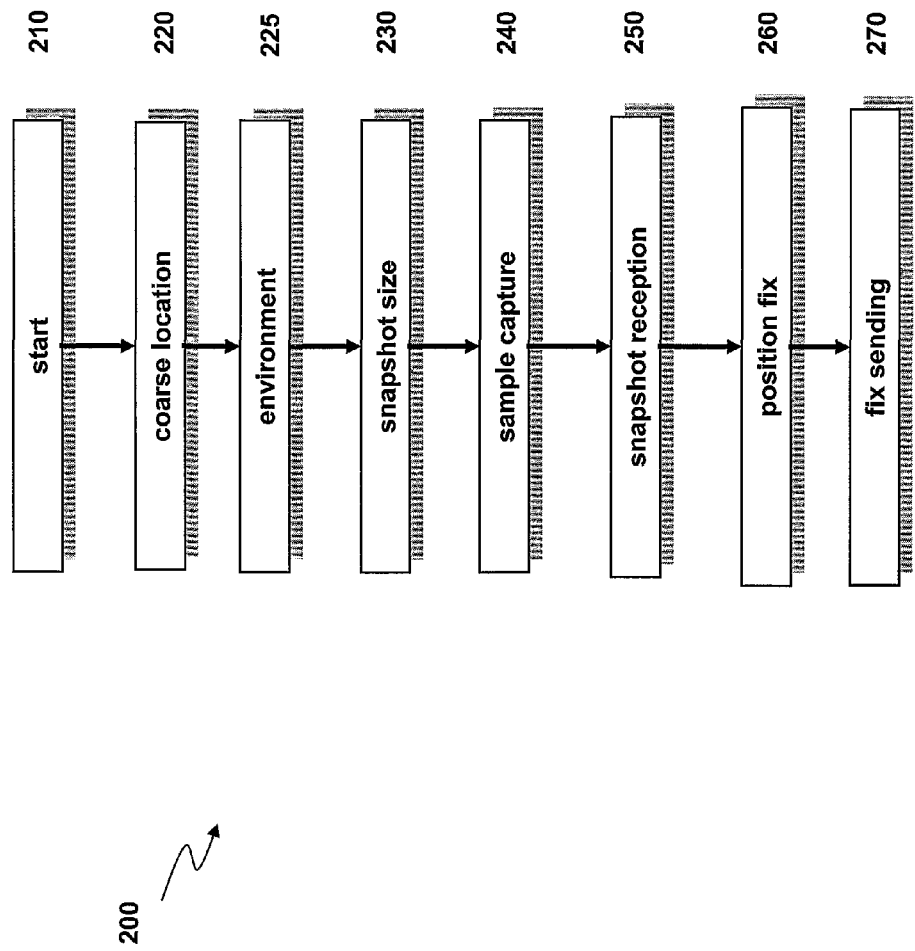
FIG. 2 is a schematic flowchart showing in terms of logical blocks an exemplary method according to the present invention.

FIG. 2 shows a schematic flowchart of a possible embodiment 200 of the method according to the present invention. The steps shown in FIG. 2 may represent operational steps of the system of FIG. 1 and, in the following, whenever possible, reference will be exemplarily made to elements and corresponding reference numerals of FIG. 1. It shall be clear form the whole present description that the blocks in FIG. 2 represents logical steps and that the flowchart of FIG. 2, and in particular the order of the blocks and/or the arrows connecting them, does not represent a chronological succession of the respective actions. Indeed, some steps may take place at a point different from that depicted in FIG. 2 and/or two or more actions may be performed partially or totally contemporarily and/or two or more sub-portions of one action may be temporally interleaved with two or more sub-portions of one or more other actions.

At step 210, the fixing session starts. In one embodiment, the network equipment 110 may receive a request for fixing the position of the user apparatus 120. The request may be received directly from the user apparatus 120 (for example from a dedicated application resident on the user apparatus) or from further network equipments which may be associated or comprised in the mobile network 140. In one scenario, the user of the user apparatus 120 directly input, through a user interface (not shown in FIG. 1) of the user apparatus or by launching the dedicated application, his/her request for a position fix and the dedicated application send the request to the network equipment 110. In another scenario a user of the user apparatus 120 uses a location based service—LBS—and this in turn triggers the sending of the fixing request to the network equipment 110, either by the resident dedicated application itself or by the further network equipment providing the LBS.

At preferred step 220 the network equipment 110 may receive or retrieve, either from the user apparatus itself or from further network equipments associated to the mobile network 140, information on the approximate geographical location of the user apparatus 120. The information on the approximate location distinguishes from the digital snapshot which is sent from the user apparatus (see step 250 below) in that they are derived from measurement or data related to signals of the mobile network 140. The digital snapshot, instead, is a digital sample of the raw signal of the positioning system (e.g. satellite-based). A simple example of information on the approximate location may be the identification of the cell or the cells of a cellular mobile network 140 that cover the user apparatus at a given instant of time. This information may be preferably sent by the user apparatus 120 together with the request for a position fix (e.g. at step 210). The degree of precision of the location may be improved by using additional mobile network data and/or measures known in the art. Examples of cellular-based location methods that exploit different measures are known as Cell-ID or Enhanced-Cell-ID (exploiting both Cell-ID data and signal strength measures and/or timing-advance or round trip time, for example in GSM/UMTS network), or Time Difference Of Arrival based methods like EOTD (Enhanced Observed Time Difference) or OTDOA (Observed Time Difference of Arrival) standardized for GSM and/or UMTS network.

At preferred step 225 the environment of the user apparatus 120 is advantageously identified. For the purpose of the present description and claims, the term 'environment', refers to the environment surrounding the user apparatus at the time of receiving the positioning signal which is stored as a digital sample, such as indoor, outdoor, in-car, rural, urban, etc, environments.

In one embodiment, a user of the user apparatus directly enter, e.g. through a user interface, information on the environment of the user apparatus. For example, a selection may be done from a menu showing to the user different types of environment-dependent position fixing, such as "weak-signal" or "strong-signal" or "(plain) localization" or "rural localization" or "urban localization" or "indoor localization" or "inside-vehicle localization", possibly associated to a degree associated to the environment, such as "light", "medium" or "deep".

In another embodiment, the user apparatus 120 performs measurements of power level on one or more signals coming from the mobile network 140, e.g. from the serving base station and nearby base stations, (e.g. according to the Network Measurement Result—NMR measures in GSM network or the Received Signal Code Power—RSCP, or pathloss, measures in UMTS network) and/or it performs measurements of interference on such signals (e.g. according to the Interference Signal Code Power—ISCP, or Received Signal Strength Indication—RSSI, measures in UMTS network). From these measures it is possible to indirectly infer a rough estimate of the environment of the user apparatus 120.

Preferably the above selection and/or the above measurements are sent from the user apparatus 120 and received at the network equipment 110.

Advantageously, the network equipment 110 may receive or retrieve, either from the user apparatus itself or from further network equipment(s) associated to the mobile network 140, information on the environment of the user apparatus 120. For example, information on the environment (e.g. rural or suburban or urban) may be derived from the information on the approximate geographical position acquired in step 220.

According to the present invention, at step 230 the size of a digital snapshot of a raw signal of a positioning system is determined depending on the receiving conditions of the positioning signal at the user apparatus at the time of receiving the sample containing the snapshot, being said digital snapshot apt to enable the fixing of the position of the user apparatus.

The expression 'receiving conditions' refers to the quality of reception of the positioning signal at a physical radio layer, such as level of power (attenuation), level of noise, level of interference and multipaths, level of sky obstruction, level of other noises, etc.

In one embodiment the step of determining the size is performed by the dedicated application directly at the user apparatus 120 after having approximately identified the environment of the user apparatus, either because a selection of the environment is directly entered into the user apparatus by a user or because the user apparatus has identified the environment by way of measurements on mobile network 140 signals or of data exchanged with the mobile network 140, as explained above.

In another preferred embodiment the step 230 is performed at the network equipment 110. The size of the digital snapshot may be determined either as a function of the explicitly identified environment of the user apparatus (e.g. at step 225) or after attempting to calculate the position fix on a received portion of digital sample of the positioning signal and checking whether the codephases and/or the pseudoranges and/or the carrier frequencies have been obtained and/or have the desired accuracy, as explained below.

In another embodiment the step 230 is performed both at the user apparatus and at the network equipment.

Determining the size of the digital snapshot of the positioning signal may comprise determining one or more parameter(s) selected from the following group: sampling frequency, number of bits per single sample and length of time of the sampled raw signal corresponding to the snapshot ('snapshot length'). Preferably, the sampling frequency and the number of bit(s) per single sample are predetermined and the sole parameter which is determined during the position fixing session of the present invention is the snapshot length. For example, in case of strong signal conditions, such as open field environment (rural and outdoor), a good value for the snapshot length may be between 1 and 20 ms, preferably between 2 and 10 ms. This value generally may increase along with the worsening of the receiving conditions of the positioning signal at the user apparatus. In weak signal conditions, the snapshot length may be between 10 to 1000 ms, preferably between 50 and 500 ms.

At step 240, a digital sample of the positioning signal may be captured by the user apparatus 120 at a given instant of time and preferably stored in the digital memory 158. The size of the captured digital sample may depend on the sampling frequency, the number of bits per single sample, and on the length of time of the sampled raw signal corresponding to the captured sample (hereinafter called 'captured sample length'), Each of the above three parameters may be either predetermined, i.e. a-priori known by the user apparatus (for example memorized in the dedicated application), or optionally determined as a function of the environment in a way similar to that described with reference to step 230. Preferably, the sampling frequency is between about 1 and 10 MHz, preferably between about 2 and 5 MHz. Preferably, the number of bits per single sample is between 1 and 12, preferably 1 or 2 bit(s) per single sample. Preferably the length of the sample captured at step 240 is between about 0.1 s to 10 s, more preferably between about 0.5 s to 2 s. Generally, the digital snapshot whose size is determined at step 230 is at least a portion of the digital sample captured at step 240. Step 240 may be performed at any point in the flowchart of FIG. 2 before step 250, for example it may take place at or before step 210.

According to the present invention, at step 250 the digital snapshot having the size determined at step 230 is sent by the user apparatus and received at the network equipment 110 via the network connection 130. According to the present invention, the digital snapshot sent from the user apparatus 120 to the network equipment 110 in step 250 is a snapshot of the raw positioning signal, preferably before performing any mathematical processing aimed at calculating the pseudoranges or the code-phases.

According to the present invention, at step 260 the position of the user apparatus is fixed at the network equipment 110 on the basis of the received digital snapshot.

Advantageously, at step 270 the network equipment 110 sends the fixed position either to the user apparatus or to another network equipment, e.g. an LBS equipment.

Figure 3:
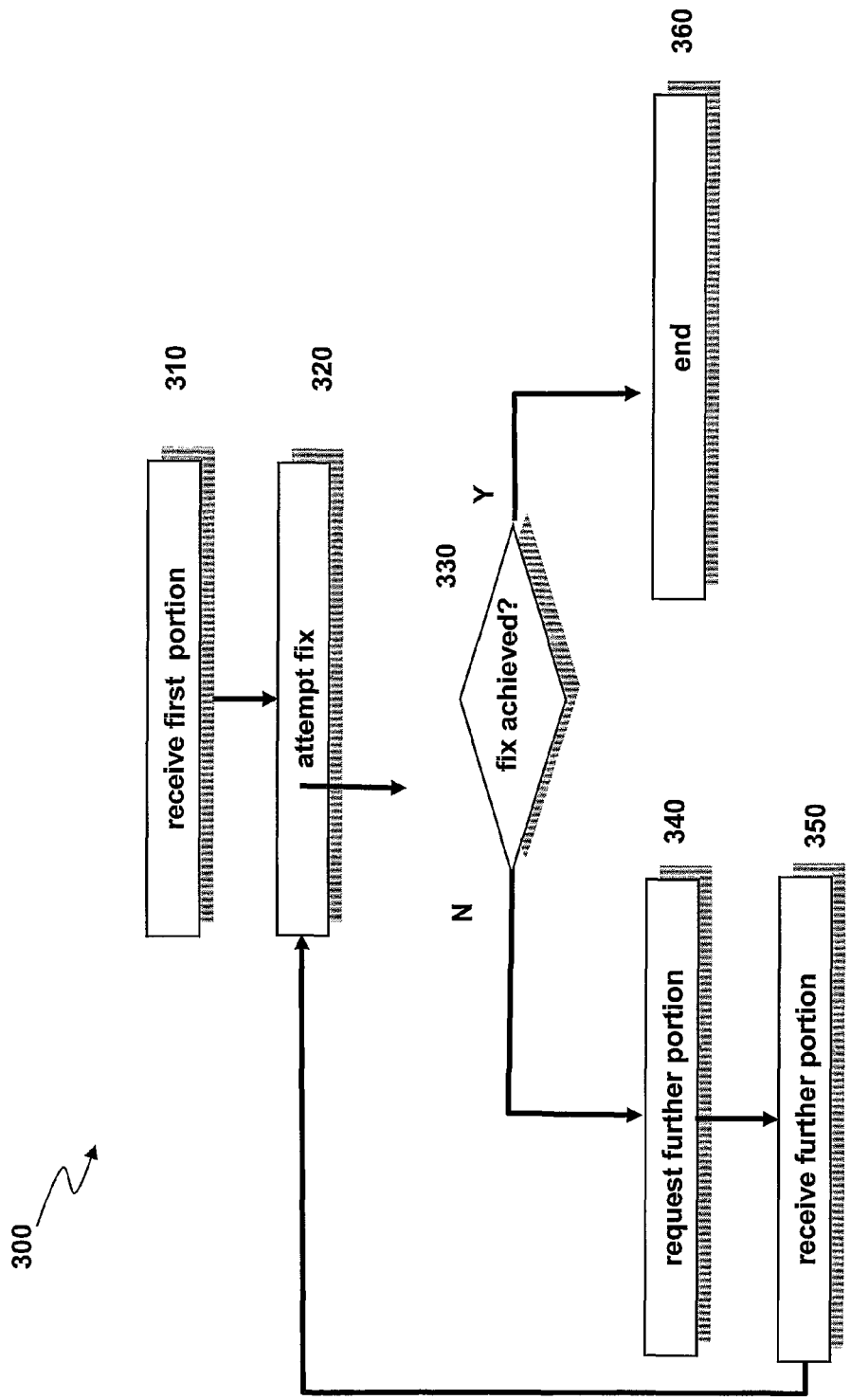
FIG. 3 is a schematic flowchart showing in terms of logical blocks an exemplary embodiment of the method according to the present invention

FIG. 3 shows a possible embodiment 300 of a portion of the method of the present invention. The steps of FIG. 3 may exemplarily correspond to, or be comprised within, the steps 230, 250 and 260 of FIG. 2.

At step 310, a first portion of the digital snapshot is received at the network equipment 110.

In a first embodiment, the size of the first portion is predetermined, for example the dedicated application is pre-configured with the value of the size of the first portion. Preferably in this case, the length of time of the first portion of the digital snapshot is between about 1 ms to 25 ms, more preferably between about 5 to 15 ms.

In a second embodiment, the size of the first portion is determined at the user apparatus 120 as a function of the identified user environment, for example as explained at step 225 above.

In a third embodiment, the size of the first portion is determined at the network equipment 110 as a function of the identified user environment, for example as explained at step 225 above. In the second and third embodiments, the length of time of the first portion of the digital snapshot may greatly vary depending on the type of environment at the user apparatus and, possibly, on the degree associated to that environment. For example it may vary between about 1 ms (strong signal, clear sky) to 1000 ms (weak signal, obstructed sky), preferably between a minimum of about 5 ms to a maximum of about 500 ms.

At step 320 the network equipment 110 attempts to fix a position by processing the received first portion of digital snapshot.

At step 330 it is checked, typically at the network equipment, whether the attempt of calculating the codephases and/or the carrier frequencies and/or the pseudoranges at step 320 succeeded and optionally, in case the result of the preceding check is affirmative, whether the calculated codephases and/or carrier frequencies and/or pseudoranges have the desired quality, e.g. the desired accuracy and/or level of noise.

In case the attempt of calculating the codephases and/or the carrier frequencies and/or the pseudoranges at step 320 succeeded and, optionally, the calculated values have acceptable quality, then the process end at step 360, possibly, if not already done before, with the calculation of a fix of the position of the user apparatus. In this case, the first portion of the snapshot represents the whole snapshot.

In case the attempt of calculating the codephases and/or the carrier frequencies and/or the pseudoranges at step 320 did not succeed or the calculated values have unacceptable quality, then the network equipment 110 sends to the user apparatus 120 a request for a second portion of the snapshot at step 340.

In one embodiment, the size of the second portion may be predetermined.

In another embodiment, the size of the second portion is determined at the network equipment 110, as a function of the identified user environment, for example as explained at step 225 above. In this case, the length of time of the second portion of the digital snapshot may greatly vary depending on the environment and the degree associated to it. For example it may vary between about 10 ms (strong signal, clear sky) to 1000 ms (weak signal, obstructed sky), preferably between a minimum of about 20 ms to a maximum of about 500 ms.

At step 350 the second portion of digital snapshot requested at step 340 is received at the network equipment 110 from the user apparatus via the network connection 130. The step comprises extracting from the digital memory 158 at the user apparatus 120 the required second portion of digital snapshot, which belongs to the sample already captured by the receiver 150 (see step 240 above) and is contiguous to the first portion within that captured sample.

At step 320 the network equipment attaches the second portion to the first portion and attempts to fix the position on the basis of the first and second portion combined together.

Than steps 330 and, in case, 340, 350 and 320 are iterated until pseudoranges values are obtained which are suitable to calculate the position (step 360).

It is noted that, in case any further portion of snapshot requested at step 340 has a predetermined size, a stepping-up of the sizes of the further portions is preferably adopted, such as, for example, the length of time of any further portion of the digital snapshot is at least two times the length of the preceding portion, more preferably at least four times. This step-up of the portions' length is advantageous in that it provides the fix within a limited number of interactions between the user apparatus and the network equipment (i.e. a limited number of iterations of steps 320, 330, 340 and 350 of FIG. 3) while guaranteeing that, in the most frequent case of strong signal, only the first small portion is communicated.

As a comparative example, the following table 1 shows a comparison between three possible embodiments of the present invention and a comparative example wherein the size of the snapshot sent to the network equipment 110 is fixed (independent from the user apparatus receiving conditions) and predetermined at a worst-case value (weak signal), so as to guarantee the fix in most of the conditions. The values in parenthesis are examples of the corresponding sizes of the snapshots (in Kb) assuming a sampling frequency of 4 MHz and 1 bit per single sample. It is noted that the sizes in Kb are comparable to available data bandwidth of commercial network connection. (e.g. from about 20 to about 2000 Kbit/s in GPRS/EDGE/UMTS mobile networks 140).

As clear from the comparative table 1, which has illustrative purpose only, the method of the present invention flexibly and dynamically adapts the length of the snapshot, which is sent from the user apparatus via the (e.g. UMTS) network connection, to the receiving conditions of the user apparatus, thus minimizing the size of the snapshot while achieving very good availability of the position fixing method.

The present invention also allows shortening, in the majority of cases, the transfer time for sending to the user equipment a suitable length of the snapshot.

Referring again to step 260 of FIG. 2, in the following some details of the process of calculating the position fix from the positioning signal snapshot will be described, with particular attention to those aspects which advantageously fit with the present invention.

According to the present invention all the mathematical calculations needed to obtain navigation data (e.g. position, velocity and/or timing) starting from the raw positioning signal are performed at the network equipment 110. This has the advantage of having available virtually unlimited processing and/or power resources. This in turn allows fast, accurate, upgradeable navigation fixing. In addition, the snapshot receiver 150 turns out to be simple, reliable and low-cost and so also the user apparatus 120. Moreover, the power consumption of the snapshot receiver 150 is very low, being associated in practice only to the duration of the digital sample memorized (no acquisition and no tracking functions are performed).

Although the following description refers to the standard positioning service of the GPS, it shall be understood that nothing in the present description shall be interpreted as limiting the present invention to this particular positioning system. The present invention finds application in connection to any positioning system, terrestrial or satellite-based, global or regional or local, present or prospective.

Indeed, one of the advantages of the present invention is its flexibility in that it may be contemporarily suitable for a plurality of positioning systems. The fact that the receiver 150 in the user apparatus 120 stores a digital sample of a positioning system and that the calculations are performed at the network equipment 110 allows, in case two or more positioning signals of two or more different positioning systems coexists on the same band (as it is the case of BPSK-GPS and BOC-GALILEO signals on L1 band) or more in general on a band receivable by the receiver 150, to process, at the network equipment 110, one or more of the two or more signals within the received snapshot. The network equipment 110 (or more properly the system 100) may act as a multi-standard posi-

TABLE 1

|  |  | Strong signal (e.g. outdoor + rural) | Medium signal (e.g. deep urban + outdoor) | Weak signal (e.g. Indoor + urban) |
| --- | --- | --- | --- | --- |
| Comparative example |  | 250 ms (1 Mb) | 250 ms (1 Mb) | 250 ms (1 Mb) |
| Embod A (size of 1$^{st}$ portion determined) | First portion | 10 ms (40 Kb) FIX | 50 ms (200 Kb) FIX | 250 ms (1 Mb) FIX |
|  | Second portion | NA | NA | NA |
| Embod B (size of 1$^{st}$ portion predet. + size of 2$^{nd}$ portion determ.) | First portion | 10 ms (40 Kb) FIX | 10 ms (40 Kb) | 10 ms (40 Kb) |
|  | Second portion | NA | 50 ms (200 Kb) FIX | 250 ms (1 Mb) FIX |
| Embod C (all portions size predetermined) | First portion | 10 ms (40 Kb) FIX | 10 ms (40 Kb) | 10 ms (40 Kb) |
|  | Second portion | NA | 50 ms (200 Kb) FIX | 50 ms (200 Kb) |
|  | Third portion | NA | NA | 200 ms (800 Kb) FIX | tioning receiver and effectively decides, transparently to the user, which are the best positioning signal(s) to decode. In addition, possible upgrade of the system of the present invention to fit to prospective positioning systems may be done by upgrading the network equipment, with no or little modifications to the user apparatus 120.

On the other hand, in the next future it is expected that the navigation satellites (e.g. those of GALILEO) will have a flexible payload so as to allow the implementation of upgrades of the positioning signal. A further advantage of the present invention is that in presence of such an upgrade, the user apparatus 120 of the present invention remains suitable for the upgraded signal (possibly after the sampling frequency has been re-configured by, e.g. the network equipment 110, so as to be adapted to the upgraded positioning signal modulation). In this case, only the network equipment 110 will need to be upgraded in respect of the signal demodulation process.

The process of calculating navigation data from the snapshot of the raw positioning signal performed at the network equipment 110 may be done in accordance to any technique known in the art.

For the sake of clarity, the process may be described as comprising at least one of the following three stages, namely an acquisition phase, a tuning phase and a navigation phase. The three steps may correspond to respective logical blocks 114, 116 and 118 of FIG. 1.

In the acquisition step, the network equipment 110 extracts, from the same received snapshot, a value (typically coarse) of code-phase and/or carrier frequency for each of the satellite signals visible to the user apparatus 120, according to any suitable technique known in the art. Preferably, the code-phase and/or carrier frequency acquisition is performed in parallel over all the code signals, within the positioning signal, coming from the visible satellites.

Advantageously, especially for those snapshots having a length greater than 20 ms, the code-phase and the carrier frequency of each satellite signal are acquired using a coherent integration technique, which allows for compensation of the phase modulation of the codes superimposed by the navigation message at 50 bit/s (i.e. one bit every 20 ms). The technique may be advantageously based on the exhaustive reconstruction of local codes having all the possible combinations of superimposed modulating bits. Such technique is referred to as 'exhaustive coherent integration'. A scan is performed in parallel over all possible sequences of bits, superimposed in all possible positions within the snapshot. Then a maximum of the autocorrelation function is searched in correspondence of the correct sequence of bits in the correct position. For example, considering a snapshot 100 ms long, typically five phase transitions corresponding to bit edges in a sequence of six bits of the navigation message are present for a total number of possible sequences of bit equal to $2^6$. Each specific sequence of bits may occupy 20 possible positions within the snapshot (because 20 periods of a Gold code fit within one bit 20 ms long and the navigation message bits fall synchronous with the Gold code chips).

In one embodiment, the network equipment 110 may receive information on the sequence of bits at 50 bit/s transmitted by each satellite in a time interval comprising the instant of transmission of the signal comprised within the received snapshot. For example, if the network equipment 110 has sent a command to the user apparatus 120 for memorizing the sample of positioning signal, the time interval above may start from the sending of the command and end at the receiving of at least a portion of the snapshot. In this case the scan described above may be partially restricted since only the bit sequences included in the navigation message portion corresponding to the time interval are considered. Advantageously, said information on the sequence of bits may be received from the reference receiver 160 of FIG. 1.

Advantageously, the calculation of the code-phase and carrier frequency is aided by receiving at network equipment 110 information on the approximate position of the user apparatus 120 (see e.g. step 220 above), so that a prediction of the Doppler shifts for each satellite signal may be performed, as known in the art related to Assisted GPS methods.

Advantageously, a dynamic compensation of the Doppler frequency shift is performed, especially when the received snapshot has a long length, for example, greater than 70 ms. In this case a search for a constant component of the Doppler shift is performed in parallel around the expected value of the Doppler shift due to the satellite movement (in order to include also the movement of the user apparatus 120 and/or the clock drift of the receiver 150) and for a further component of Doppler drift due to the variation of the satellite movement within the duration of the snapshot. In case the received snapshot is short, e.g. below about 20 ms, the Doppler drift may be neglected.

The autocorrelation function for integration with Doppler compensation may be performed in the time domain or in the frequency domain, e.g. via a Fast Fourier Transform applied on a sequence of snapshot blocks. The Doppler compensation may be performed specifically on each block.

The acquisition phase typically outputs the code-phases with accuracy comparable to the sampling interval of the digital snapshot (i.e. the inverse of the sampling frequency).

The step of tuning then fine-tunes the code-phase and/or frequency values output from the acquisition phase in accordance to any technique known in the art, such as the cross-correlation techniques. For example, the fine-tuning may be performed using conventional code and/or carrier tracking loops (of the kind, e.g., based on two coupled phase locked loops) or, especially for the frequency tuning, the technique known in the art as BASS method (based on the phase difference among two delayed intervals).

Advantageously, the conventional demodulation of the 50 bit/s message, e.g. in the conventional tracking phase, is not performed according to the present invention.

After precise values of code-phase and/or frequency have been obtained from the tuning phase, the step of navigation provides navigation data based on these values.

Preferably, the ambiguity known in the art as 'integer millisecond ambiguity' (the PRN codes repeat every millisecond and as a result the circular correlation of the received and locally generated PRN codes only allows to calculate the sub-millisecond part of the satellite signal transit time) is solved so as to obtain unambiguous pseudorange measures. Preferably, the ambiguity is solved using information on the approximate position of the user apparatus 120, as explained above. Since a 1 millisecond difference in transit time corresponds to a difference in the satellite pseudorange of 300 km, knowledge of the user apparatus' 120 position to within approximately 100 km will allow the calculation of the integer number of milliseconds in the signal transit times.

If the user apparatus 120 position is not known to this degree of accuracy the data bit edges on the satellite signals can act as timing marks with a spacing of 20 ms (corresponding to about 6000 km). Since the modulation of the satellite signal by the data is synchronised to an atomic clock, the position of the data bit edges in the received signal gives a coarse measure of transit time which is nonetheless accurate to within one millisecond.

Advantageously, the position of the visible satellites at the instant of transmission $T_{TOT}$ of the respective signal is evaluated according to known techniques. Preferably, in order to know the position of the visible satellites, the network equipment 110 evaluates first the time of transmission $T_{TOT}$ of the respective satellite signal comprised within the snapshot.

In one embodiment, especially suitable for snapshot long at least 100 ms, the time instant of transmission $T_{TOT}$ is derived from the knowledge of the correct sequence of superimposed modulating bits of the 50 bit/s navigation message (as explained in the acquisition phase above). By positioning the first received single sample of the received snapshot in the correct position within the GPS signal transmitted by the respective satellite, the time instant of transmission $T_{TOT}$ may be calculated (in seconds with reference to the week time) using the following formula:

$$T_{TOT} = \text{SubframeNumber} * 6 \text{ s} + (\text{firstbitNumber} - 1) * 20 \text{ ms} + (C\!A\text{codeNumber} - 1) * 1 \text{ ms} + \text{IntegerChipCount} + \text{fractionalChip}$$

wherein SubframeNumber represents the 6 s-subframe number in the navigation message wherein the first single sample of the snapshot falls, firstbitNumber represents the number of the 20 ms-bit within the subframe, CAcodeNumber represents the number of the C/A 1 ms-code repetition within the 20 ms-bit, IntegerChipCount, output from acquisition phase, represents the chip number in the C/A code expressed in proper time unit (about 1 μsecond), and fractionalChip, output from the tuning phase, represents the chip fraction in the proper unit time. It is noted that the instant of transmission $T_{TOT}$ refers to the first received individual sample within the received snapshot.

It may happen that, for the correct sequence of received navigation message bits, that sequence occurs at different instants of time within the expected interval of transmission (especially if the sequence is short, e.g. less than or equal to 3 or 4 bits). This ambiguity may be solved by considering simultaneously all the bit sequences transmitted by the visible satellites. Preferably, the differences in propagation times are taken into account, for example exploiting the information from the reference receiver 160.

In another embodiment, especially suitable for snapshot shorter than 100 ms, the capture time of the first single sample of the snapshot is evaluated. The expected time interval comprising the instant of transmission of the signals comprised within the received snapshot is partitioned in discrete time intervals. The time partition interval may exemplary be 1 ms, which corresponds to an error in the output of the navigation phase of about 1 meter due to the satellite motion. For each instant k, the satellite constellation which would have transmitted the signals received at the capture time k is calculated using the pseudoranges. The range $r_i$ between each $i^{th}$ satellite and the user apparatus is estimated as the difference between the satellite position in the constellation and the position of the user apparatus obtained resolving the GPS navigation solution considering the satellite constellation and the pseudoranges. Then the quadratic error between the pseudorange differences and the corresponding range differences is evaluated for each instant k and the value of k which minimizes the error represents the capture time, according to the following:

$$\operatorname*{Min}_k(Err^{(k)}) = \operatorname*{Min}_k \sum_{i=1}^{N\_sat} \sum_{j=i+1}^{N\_sat} [(\rho_i - \rho_j) - (r_i^{(k)} - r_j^{(k)})]^2,$$

wherein $\rho_i$ represents the pseudorange with respect to the $i^{th}$ satellite and $r_i^{(k)}$ represents the range described above.

The latter method preferably requires at least five visible satellites or four visible satellites and the knowledge of the altitude of the user apparatus 120. This method may also be applied to solve possible ambiguities remaining from the preceding method.

It is noted that the knowledge of the instant of transmission may be exploited for deriving an estimate of the Doppler shift due to the satellites' motion, as well as the Doppler drift, for example during the acquisition phase.

Once the position of the visible satellites has been calculated, it is possible to solve the navigation equations well known in the art.

Although the present invention has been disclosed and described by way of some embodiments, it is apparent to those skilled in the art that several modifications to the described embodiments, as well as other embodiments of the present invention are possible without departing from the spirit or essential features thereof/the scope thereof as defined in the appended claims.

The invention claimed is:

1. A method for fixing a position of a user apparatus with the assistance of a cellular communications network comprising:
   starting a fixing session and, within said fixing session:
      determining, at network equipment, a size of a first portion of a snapshot of a signal of a positioning system depending on the quality of said signal at the user apparatus, said snapshot being capable of enabling the fixing of the position;
      communicating to the user apparatus said size of the first portion;
      receiving, at network equipment, from the user apparatus via a network connection the first portion of said snapshot; and
      fixing at the network equipment the position of the user apparatus on the basis of said snapshot.

2. The method of claim 1, wherein determining the size of the first portion of the snapshot comprises identifying the environment of the user apparatus and determining the size of the snapshot depending on said identified environment.

3. The method of claim 1, further comprising, at the network equipment, sending to the user apparatus a request for a second portion of said snapshot and receiving said second portion of said snapshot.

4. The method of claim 3, wherein a size of the second portion is predetermined.

5. The method of claim 4, wherein the size of the second portion is at least two times the size of the first portion.

6. The method of claim 4, further comprising sending to the user apparatus a request for a third portion of said snapshot having the respective size predetermined and receiving said third portion of said snapshot.

7. The method of claim 3, wherein determining the size of said snapshot comprises determining, at the network equipment, a size of the second portion and further comprising communicating to the user apparatus said size of the second portion before receiving the second portion of said snapshot.

8. The method of claim 1, wherein determining the size of the first portion of said snapshot comprises receiving measurement data related to at least a signal of a mobile network and determining said size of the first portion of said snapshot on the basis of said data.

9. The method of claim 1, wherein determining the size of the first portion of said snapshot comprises determining the length of time of the signal of the positioning system corresponding to said snapshot.

10. The method of claim 1, wherein the network connection is a mobile network connection.

11. The method of claim 1, wherein the positioning system is a satellite-based positioning system.

12. The method of claim 1, wherein starting the fixing session comprises receiving at the network equipment from the user apparatus a request for fixing the position.

13. The method of claim 1, further comprising sending the fixed position from the network equipment to the user apparatus through said network connection.

14. A system for providing a service of positioning of a mobile user apparatus with the assistance of a cellular communications network, comprising:
   network equipment;
   a mobile user apparatus capable of establishing a mobile network connection with the network equipment, the mobile user apparatus comprising a receiver capable of digitally sampling a signal of a positioning system, the network equipment and the mobile user apparatus being capable of cooperating so as to implement the method of:
   determining, at network equipment, a size of a first portion of a snapshot of a signal of a positioning system depending on the quality of said signal at the user apparatus, said snapshot being capable of enabling the fixing of the position;
   communicating to the user apparatus said size of the first portion;
   receiving, at network equipment, from the user apparatus via a network connection the first portion of said snapshot; and
   fixing at the network equipment the position of the user apparatus on the basis of said snapshot.

15. A service for providing a user of a user apparatus of a fix of the position of the user apparatus with the assistance of a cellular communications network, wherein said fix of the position is based on the method of:
   determining, at network equipment, a size of a first portion of a snapshot of a signal of a positioning system depending on the quality of said signal at the user apparatus, said snapshot being capable of enabling the fixing of the position;
   communicating to the user apparatus said size of the first portion;
   receiving, at network equipment, from the user apparatus via a network connection the first portion of said snapshot; and
   fixing at the network equipment the position of the user apparatus on the basis of said snapshot.

* * * * *